United States Patent
Cheng et al.

(10) Patent No.: US 9,559,541 B2
(45) Date of Patent: Jan. 31, 2017

(54) MODULAR MULTILEVEL CONVERTER AND CHARGING CIRCUIT THEREFOR

(71) Applicants: Zhongyuan Cheng, Kitchener (CA); Bin Wu, Toronto (CA); Navid R. Zargari, Cambridge (CA); Kai Tian, Toronto (CA); David Dewei Xu, Pickering (CA)

(72) Inventors: Zhongyuan Cheng, Kitchener (CA); Bin Wu, Toronto (CA); Navid R. Zargari, Cambridge (CA); Kai Tian, Toronto (CA); David Dewei Xu, Pickering (CA)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 152 days.

(21) Appl. No.: 14/597,261

(22) Filed: Jan. 15, 2015

(65) Prior Publication Data

US 2016/0211762 A1 Jul. 21, 2016

(51) Int. Cl.
- *H02M 5/458* (2006.01)
- *H02M 7/06* (2006.01)
- *H02J 7/00* (2006.01)
- *H02M 7/483* (2007.01)

(52) U.S. Cl.
CPC ............ *H02J 7/0072* (2013.01); *H02M 7/483* (2013.01); *H02M 2007/4835* (2013.01)

(58) Field of Classification Search
CPC ..... H02M 7/483; H02M 7/4835; H02J 7/0072
See application file for complete search history.

(56) References Cited

U.S. PATENT DOCUMENTS

| | | |
|---|---|---|
| 4,443,841 A | 4/1984 | Mikami et al. |
| 4,783,728 A | 11/1988 | Hoffman |
| 4,894,621 A | 1/1990 | Koenig et al. |
| 5,298,848 A | 3/1994 | Ueda et al. |
| 5,361,196 A | 11/1994 | Tanamachi et al. |
| 5,502,633 A | 3/1996 | Miyazaki et al. |

(Continued)

FOREIGN PATENT DOCUMENTS

| | | |
|---|---|---|
| CN | 1190278 | 8/1998 |
| CN | 1253999 | 5/2000 |

(Continued)

OTHER PUBLICATIONS

Akagi et al., "A Passive EMI Filter for Eliminating Both Bearing Current and Ground Leakage Current From an Inverter-Driven Motor", IEEE Transactions on Power Electronics, 2006, pp. 1459-1469.

(Continued)

*Primary Examiner* — Jue Zhang
(74) *Attorney, Agent, or Firm* — Fay Sharpe LLP

(57) ABSTRACT

Methods and charging apparatus are presented for charging cell capacitors of a multilevel power conversion system, in which an auxiliary charging source is selectively applied across DC bus terminals while one or more selected multilevel converter cells are alternately switched between a first state to bypass the selected cell or cells and a second state to charge the cell capacitor or capacitors of the selected cell via charging current from the auxiliary charging source.

20 Claims, 12 Drawing Sheets

(56) References Cited

U.S. PATENT DOCUMENTS

| | | |
|---|---|---|
| 5,625,545 A | 4/1997 | Hammond |
| 5,638,263 A | 6/1997 | Opal et al. |
| 5,642,275 A | 6/1997 | Peng et al. |
| 5,790,396 A | 8/1998 | Miyazaki et al. |
| 5,933,339 A | 8/1999 | Duba et al. |
| 5,986,909 A | 11/1999 | Hammond et al. |
| 6,005,788 A | 12/1999 | Lipo et al. |
| 6,031,738 A | 2/2000 | Lipo et al. |
| 6,058,031 A | 5/2000 | Lyons et al. |
| 6,075,350 A | 6/2000 | Peng |
| 6,075,717 A | 6/2000 | Kumar et al. |
| 6,101,109 A | 8/2000 | Duba et al. |
| 6,166,929 A | 12/2000 | Ma et al. |
| 6,222,284 B1 | 4/2001 | Hammond et al. |
| 6,229,722 B1 | 5/2001 | Ichikawa et al. |
| 6,236,580 B1 | 5/2001 | Aiello et al. |
| 6,269,010 B1 | 7/2001 | Ma et al. |
| 6,295,215 B1 | 9/2001 | Faria et al. |
| 6,320,767 B1 | 11/2001 | Shimoura et al. |
| 6,359,416 B1 | 3/2002 | Rao et al. |
| 6,366,483 B1 | 4/2002 | Ma et al. |
| 6,411,530 B2 | 6/2002 | Hammond et al. |
| 6,469,916 B1 | 10/2002 | Kerkman et al. |
| 6,477,067 B1 | 11/2002 | Kerkman et al. |
| 6,541,933 B1 | 4/2003 | Leggate et al. |
| 6,556,461 B1 | 4/2003 | Khersonsky et al. |
| 6,617,821 B2 | 9/2003 | Kerkman et al. |
| 6,636,012 B2 | 10/2003 | Royak et al. |
| RE38,439 E | 2/2004 | Czerwinski |
| 6,697,271 B2 | 2/2004 | Corzine |
| 6,697,274 B2 | 2/2004 | Bernet et al. |
| 6,703,809 B2 | 3/2004 | Royak et al. |
| 6,720,748 B1 | 4/2004 | Seibel et al. |
| 6,795,323 B2 | 9/2004 | Tanaka et al. |
| 6,819,070 B2 | 11/2004 | Kerkman et al. |
| 6,819,077 B1 | 11/2004 | Seibel et al. |
| 6,842,354 B1 | 1/2005 | Tallam et al. |
| 6,859,374 B2 | 2/2005 | Pollanen et al. |
| 6,982,533 B2 | 1/2006 | Seibel et al. |
| 7,034,501 B1 | 4/2006 | Thunes et al. |
| 7,057,905 B2 | 6/2006 | Macmillan |
| 7,068,526 B2 | 6/2006 | Yamanaka |
| 7,106,025 B1 | 9/2006 | Yin et al. |
| 7,164,254 B2 | 1/2007 | Kerkman et al. |
| 7,170,767 B2 | 1/2007 | Bixel |
| 7,180,270 B2 | 2/2007 | Rufer |
| 7,215,559 B2 | 5/2007 | Nondahl et al. |
| 7,274,576 B1 | 9/2007 | Zargari et al. |
| 7,336,509 B2 | 2/2008 | Tallam |
| 7,342,380 B1 | 3/2008 | Kerkman et al. |
| 7,356,441 B2 | 4/2008 | Kerkman et al. |
| 7,400,518 B2 | 7/2008 | Yin et al. |
| 7,428,158 B2 | 9/2008 | Bousfield, III et al. |
| 7,471,525 B2 | 12/2008 | Suzuki et al. |
| 7,495,410 B2 | 2/2009 | Zargari et al. |
| 7,495,938 B2 | 2/2009 | Wu et al. |
| 7,511,976 B2 | 3/2009 | Zargari et al. |
| 7,568,931 B2 | 8/2009 | Hammond |
| 7,589,984 B2 | 9/2009 | Salomaki |
| 7,649,281 B2 | 1/2010 | Lai et al. |
| 7,800,254 B2 | 9/2010 | Hammond |
| 7,830,681 B2 | 11/2010 | Abolhassani et al. |
| 7,894,224 B2 | 2/2011 | Ulrich |
| 7,978,488 B2 | 7/2011 | Tanaka et al. |
| 8,008,923 B2 | 8/2011 | Hammond |
| 8,040,101 B2 | 10/2011 | Itoh et al. |
| 8,093,764 B2 | 1/2012 | Hammond |
| 8,107,267 B2 | 1/2012 | Tallam et al. |
| 8,130,501 B2 | 3/2012 | Ledezma et al. |
| 8,138,697 B2 | 3/2012 | Palma |
| 8,144,491 B2 | 3/2012 | Bendre et al. |
| 8,159,840 B2 | 4/2012 | Yun |
| 8,279,640 B2 | 10/2012 | Abolhassani et al. |
| 8,400,793 B2 | 3/2013 | Jonsson |
| 8,441,147 B2 | 5/2013 | Hammond |
| 8,508,066 B2 | 8/2013 | Lee et al. |
| 8,619,446 B2 | 12/2013 | Liu et al. |
| 8,817,499 B2 | 8/2014 | Videt |
| 8,860,380 B2 * | 10/2014 | Hasler .................. H02M 7/483 307/109 |
| 8,929,111 B2 | 1/2015 | White |
| 8,982,593 B2 | 3/2015 | Nondahl et al. |
| 9,007,787 B2 | 4/2015 | Zargari et al. |
| 9,036,379 B2 | 5/2015 | Schroeder |
| 9,083,230 B2 | 7/2015 | Narimani et al. |
| 2001/0048290 A1 | 12/2001 | Underwood et al. |
| 2007/0211501 A1 | 9/2007 | Zargari et al. |
| 2007/0297202 A1 | 12/2007 | Zargari et al. |
| 2008/0079314 A1 | 4/2008 | Hammond |
| 2008/0174182 A1 | 7/2008 | Hammond |
| 2008/0180055 A1 | 7/2008 | Zargari et al. |
| 2009/0073622 A1 | 3/2009 | Hammond |
| 2009/0085510 A1 | 4/2009 | Pande et al. |
| 2009/0128083 A1 | 5/2009 | Zargari |
| 2009/0184681 A1 | 7/2009 | Kuno |
| 2010/0025995 A1 | 2/2010 | Lang et al. |
| 2010/0078998 A1 | 4/2010 | Wei et al. |
| 2010/0080028 A1 | 4/2010 | Cheng et al. |
| 2010/0091534 A1 | 4/2010 | Tadano |
| 2010/0109585 A1 | 5/2010 | Iwahori et al. |
| 2010/0141041 A1 | 6/2010 | Bose et al. |
| 2010/0301975 A1 | 12/2010 | Hammond |
| 2011/0019449 A1* | 1/2011 | Katoh .................. H02M 7/483 363/124 |
| 2011/0095603 A1 | 4/2011 | Lee et al. |
| 2011/0249479 A1 | 10/2011 | Capitaneanu et al. |
| 2012/0057380 A1 | 3/2012 | Abe |
| 2012/0057384 A1 | 3/2012 | Jones |
| 2012/0113698 A1 | 5/2012 | Inoue |
| 2012/0195087 A1 | 8/2012 | Kroeze et al. |
| 2012/0201056 A1 | 8/2012 | Wei |
| 2012/0212982 A1 | 8/2012 | Wei et al. |
| 2012/0218795 A1 | 8/2012 | Mihalache |
| 2013/0121041 A1 | 5/2013 | Schroeder et al. |
| 2013/0121042 A1 | 5/2013 | Gan et al. |
| 2013/0148390 A1 | 6/2013 | Na |
| 2013/0223651 A1 | 8/2013 | Hoyerby |
| 2013/0272045 A1 | 10/2013 | Soeiro |
| 2014/0003099 A1 | 1/2014 | Dillig et al. |
| 2014/0036557 A1 | 2/2014 | Liu et al. |
| 2014/0042817 A1 | 2/2014 | Zargari et al. |
| 2014/0063870 A1 | 3/2014 | Bousfield, III |
| 2014/0098587 A1 | 4/2014 | Yatsu |
| 2014/0146586 A1* | 5/2014 | Das ........................ H02M 7/49 363/49 |
| 2014/0204632 A1 | 7/2014 | Noetzold et al. |
| 2014/0268928 A1 | 9/2014 | Wei et al. |
| 2014/0268967 A1 | 9/2014 | White et al. |
| 2014/0293667 A1 | 10/2014 | Schroeder et al. |
| 2014/0376287 A1 | 12/2014 | Wu et al. |
| 2015/0280608 A1* | 10/2015 | Yoscovich ............ H02M 7/483 363/131 |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 1400731 A | 3/2005 |
| CN | 2737060 | 10/2005 |
| CN | 1925289 | 3/2007 |
| CN | 101795057 A | 8/2010 |
| CN | 102739030 A | 10/2012 |
| CN | 102983568 A | 3/2013 |
| CN | 103051167 A | 4/2013 |
| CN | 103078539 A | 5/2013 |
| EP | 0874448 | 10/1998 |
| EP | 1641111 A2 | 3/2006 |
| EP | 1713168 A3 | 10/2006 |
| EP | 2378865 | 4/2012 |
| EP | 2568591 A1 | 3/2013 |
| EP | 2698912 A2 | 2/2014 |
| EP | 2838189 A2 | 2/2015 |

(56) References Cited

FOREIGN PATENT DOCUMENTS

| GB | 1295261 A | 11/1972 |
|---|---|---|
| GB | 2345594 A | 7/2000 |
| JP | 2006223009 A | 8/2006 |
| JP | 2013102674 A | 5/2013 |
| KR | 20080061641 A | 7/2008 |
| TW | 439350 | 6/2001 |
| WO | WO2012105737 A1 | 8/2012 |
| WO | WO2013091675 A1 | 6/2013 |

OTHER PUBLICATIONS

Akagi et al., "An Approach to Eliminating High-Frequency Shaft Voltage and Ground Leakage Current From an Inverter-Driven Motor", IEEE Transactions on Industry Applications, 2004 , pp. 1162-1169.
Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.
Angulo, Mauricio, et al., "Level-shifted PMW for Cascaded Multilevel Inverters with Even Power Distribution", IEEE Power Electronics Specialists Conference (PESC), pp. 2373-2378, Jun. 2007.
Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.
Barbosa et al.; "Active neutral-point-clamped multilevel converters," in Proc. IEEE 36th Power Electron. Spec. Conf., Jun. 16, 2005, pp. 2296-2301.
Bruckner et al., "The active NPC converter and its loss-balancing control," IEEE Trans. Ind. Electron., vol. 52, No. 3, pp. 855-868, Jun. 2005.
Cacciato et al., "Modified space-vector-modulation technique for common mode currents reduction and full utilization of the DC bus", in Proc. IEEE APEC Conf. Rec., 2009, pp. 109-115.
Cacciato et al., "Reduction of common mode currents in PWM inverter motor drives", IEEE Trans. Ind. Appl., vol. 35, No. 2, pp. 469â€ 476, Mar./Apr. 1999.
Cavalcanti et al., "Modulation Techniques to Eliminate Leakage Currents in Transformerless Three-Phase Photovoltaic Systems", IEEE Transactions on Industrial Electronics, 2010 , pp. 1360-1368.
Cengelci, E., et al., A New Medium Voltage PWM Inverter Topology for Adjustable Speed Drives, IEEE, 0-7803-4943-1, 1998, pp. 1416-1423.
Cha, Han Ju et al. An Approach to Reduce Common-Mode Voltage in Matrix Converter, Jul./Aug. 2003, IEEE, vol. 39, pp. 1151-1159.
Cha, Han Ju, "Analysis and Design of Matrix Converter for Adjustable Speed Drive and Distributed Power Sources", Aug. 2004, Texas A&M Univ., Doctor of Philosophy Dissertation Paper.
Chaudhuri, Toufann, et al., Introducing the Common Cross Connected Stage ($C^3S$) for the 5L ANPC Multilevel Inverter, IEEE, 978-1-4244-1668-4, 2008, pp. 167-173.
Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.
De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.
Erdman, Russel J. Kerkman, David W. Schlegel, and Gary L. Skibinski, "Effect of PWM Inverters on AC Motor Bearing Currents and Shaft Voltages", 1996 IEEE.
Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Floricau, Dan et al., A new stacked NPC converter: 3L-topology and control, Proceedings of the $12^{th}$ European Conf. on Power Electronics and Applications, EPE 2007, EPE Association, 2007, 10 pgs.
Glinka, M., Prototype of Multiphase Modular-Multilevel-Converter with 2 MW power rating and 17-level-output-voltage, IEEE, 0-7803-8399-0, 2004, pp. 2572-2576.
Guennegues et al., "Selective harmonic elimination PWM applied to H-bridge topology in high speed applications," in Proc. Int. Conf. POWERENG, Mar. 18-20, 2009, pp. 152-156.
Guennegues, V., et al., A Converter Topology for High Speed Motor Drive Applications, IEEE Xplore, 2009, 8 pgs.
Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.
Hava et al., "A high-performance PWM algorithm for common-mode voltage reduction in three-phase voltage source inverters," IEEE Trans. Power Electron., vol. 26, No. 7, pp. 1998-2008, Jul. 2011.
Hiller, Mark et al., Medium-Voltage Drives; An overview of the common converter topologies and power semiconductor devices, IEEE Industry Applications Magazine, Mar.-Apr. 2010, pp. 22-30.
Horvath, "How isolation transformers in MV drives protect motor insulation", TM GE Automation Systems, Roanoke, VA, 2004.
Hua, Lin, "A Modulation Strategy to Reduce Common-Mode Voltage for Current-Controlled Matrix Converters", Nov. 2006, IEEE Xplore, pp. 2775-2780.
Iman-Eini, Hossein et al., "A Fault-Tolerant Control Strategy for Cascaded H-Bridge Multilevel Rectifiers", Journal of Power Electronics, vol. 1, Jan. 2010.
Kerkman, et al., "PWM Inverters and Their Influence on Motor Over-Voltage," 1997 IEEE.
Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.
Kieferndorf et al., "A new medium voltage drive system based on anpc-5l technology," in Proc. IEEE-ICIT, Viña del Mar, Chile, Mar. 2010,pp. 605-611.
Kouro et al., "Recent advances and industrial applications of multilevel converters," IEEE Trans. Ind. Electron., vol. 57, No. 8, pp. 2553-2580, Aug. 2010.
Lai et al., "Optimal common-mode voltage reduction PWM technique for inverter control with consideration of the dead-time effects-part I: basic development," IEEE Trans. Ind. Appl., vol. 40, No. 6, pp. 1605-1612, Nov./Dec., 2004.
Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.
Lesnicar et al., "An Innovative Modular Multilevel Converter Topology Suitable for a Wide Power Range", 2003 IEEE Bologna PowerTech Conference, Jun. 23-26, Bologna Italy, 6 pgs.
Lesnicar, A., et al., A new modular voltage source inverter topology, Inst. of Power Electronics and Control, Muenchen, DE, Oct. 10, 2007, pp. 1-10.
Lezana, Pablo et al., "Survey on Fault Operation on Multilevel Inverters", IEEE Transactions on Industrial Electronics, vol. 57, No. 7, Jul. 2010, pp. 2207-2217.
Li, Jun, et al., A New Nine-Level Active NPC (ANPC) Converter for Grid Connection of Large Wind Turboines for Distributed Generation, IEEE Transactions on Power Electronics, vol. 26, No. 3, Mar. 2011, pp. 961-972.
McGrath, Brendan Peter et al., "Multicarrier PMW Strategies for Multilevel Inverters," IEEE Transactions on Industrial Electronics, vol. 49, No. 4, pp. 858-867, Aug. 2002.
Meili et al., "Optimized pulse patterns for the 5-level ANPC converter for high speed high power applications," in Proc. 32nd IEEE IECON, Nov. 6-10, 2006, pp. 2587-2592.
Muetze & A. Binder, "Don't lose Your Bearings", Mitigation techniques for bearing currents in inverter-supplied drive systems, 2006 IEEE.

(56) References Cited

OTHER PUBLICATIONS

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Robicon, "Perfect Harmony MV Drive Product Overview", 18 pgs . . . obtained from the World Wide Web Apr. 2013.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Rodriguez et al., "Multilevel inverters: A survey of topologies, controls, and applications," IEEE Trans. Ind. Electron., vol. 49, No. 4, pp. 724-738, Aug. 2002.

Rodriguez et al., "Operation of a Medium-Voltage Drive Under Faulty Conditions", IEEE Transactions on Industrial Electronics, vol. 52, No. 4, Aug. 2005, pp. 1080-1085.

Rodriguez, et al., "Multilevel voltage source-converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Saeedifard, Maryann et al., Analysis and Control of DC-Capacitor-Voltage-Drift Phenomenon of a Passive Front-End Five-Level Converter, IEEE Transactions on Industrial Electronics, vol. 54, No. 6, Dec. 2007, pp. 3255-3266.

Sedghi, S. et al., "A New Multilevel Carrier Based Pulse Width Modulation Method for Modular Multilevel Inverter", IEEE, 8$^{th}$ International Conference on Power Electronics—ECCE Asia (ICPE & ECCE), pp. 1432-1439, May 30-Jun. 3, 2011.

Sepahvand, Hossein et al., "Fault Recovery Strategy for Hybrid Cascaded H-Bridge Multi-Level Inverters", 2011 IEEE, pp. 1629-1633.

Serpa et al., "Fivelevel virtual-flux direct power control for the active neutral-point clamped multilevel inverter," in Proc. IEEE Power Electron. Spec. Conf.

Silva, Cesar et al., Control of an Hybrid Multilevel Inverter for Current Waveform Improvement, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., Floating Capacitor Voltage Regulation in Diode Clamped Hybrid Multilevel Converters, IEEE, 978-1-4244-3439-8, 2009, pp. 197-202.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr. 2009.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., Synthesis of Multilevel Converters Based on Single-and/or Three-Phase Converter Building Blocks, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012 , pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Supression in Neutral-Connected Power Converter Systems. IEEE Transactions on Power Electronics, 2012, pp. 1228-1236.

Abu-Rub, "Medium-Voltage Multilevel Converters-State of the Art, Challenges, and Requirements in Industrial Applications", IEEE Transactions on Industrial Electronics, vol. 57, N. 8, Aug. 2010, pp. 2581-2596.

Peng, "A Generalized Multilevel Inverter Topology with Self Voltage Balancing", IEE Transactions on Industry Applications, vol. 37, No. 2, Mar./Apr. 2001, pp. 611-618.

Choi et al., "A General Circuit Topology of Multilevel Inverter", Power Electronics Specialists Conference, 1991, PESC '92 Record., 22$^{nd}$ Annual IEEE, Jun. 24-27, 1991, 8 pgs.

Zhang et al., "A Multilevel Converter Topology with Common Flying Capacitors", IEEE, 2013, pp. 1274-1280.

Loh et al., "Reduced Common-Mode Modulation Strategies for Cascaded Multilevel Inverters"; IEEE Transactions on Industry Applications; IEEE Service Center, Piscataway, NJ; vol. 39, No. 5; Sep. 1, 2003; pp. 1386-1395.

Zhang et al., "Multilevel Inverter Modulation Schemes to Eliminate Common-Mode Voltages"; IEEE Transactions on Industry Applications; IEEE Service Center, Piscataway, NJ; vol. 36, No. 6; Nov. 1, 2000; pp. 1645-1653.

Kim et al., "A New PWM Strategy for Common-Mode Voltage Reduction in Neutral-Point-Clamped Inverter-Fed AC Motor Drives"; IEEE Transactions on Industry Applications; IEEE Service Center, Piscataway, NJ; vol. 37, No. 6; Nov. 11, 2001; pp. 1840-1845.

Celanovic et al., "A Comprehensive Study of Neutral-Point Voltage Balancing Problem in Three-Level Neutral-Point-Clamped Voltage Source PWM Inverters"; IEEE Transactions on Power Electronics, Institute of Electrical and Electronics Engineers; vol. 15, No. 2; Feb. 1, 2000, pp. 242-249.

Ghias et al., "Performance Evaluation of a Five-Level Flying Capacitor Converter With Redcued DC Bus Capacitance Under Two Different Modulation Schemes"; Power Electronics for Distributed

(56) References Cited

OTHER PUBLICATIONS

Generation Systems (PEDG); 2012 $3^{rd}$ IEEE Int'l Symposium, IEEE, Jun. 25, 2012; pp. 857-864.
Ghias et al., "Voltage Balancing Strategy for a Five-Level Flying Capacitor Converter Using Phase Disposition PWM With Sawtooth-Shaped Carriers";IECON 2012-$38^{th}$ Annual Conf., IEEE Industrial Electronics Society; Oct. 25, 2012; pp. 5013-5019.
Maia et al., "Associating PWM and Balancing Techniques for Performance Improvement of Flying Capacitor Inverter"; 2013 Brazilian Power Electronics Conf., IEEE; Oct. 27, 2013; pp. 92-99.
U.S. Appl. No. 14/153,103, filed Jan. 13, 2014.
U.S. Appl. No. 14/151,142, filed Jan. 9, 2014.
U.S. Appl. No. 14/710,690, filed May 13, 2015.
U.S. Appl. No. 13/845,416, filed Mar. 18, 2013.
U.S. Appl. No. 14/636,299, filed Mar. 3, 2015.
U.S. Appl. No. 14/628,334, filed Feb. 23, 2015.

\* cited by examiner

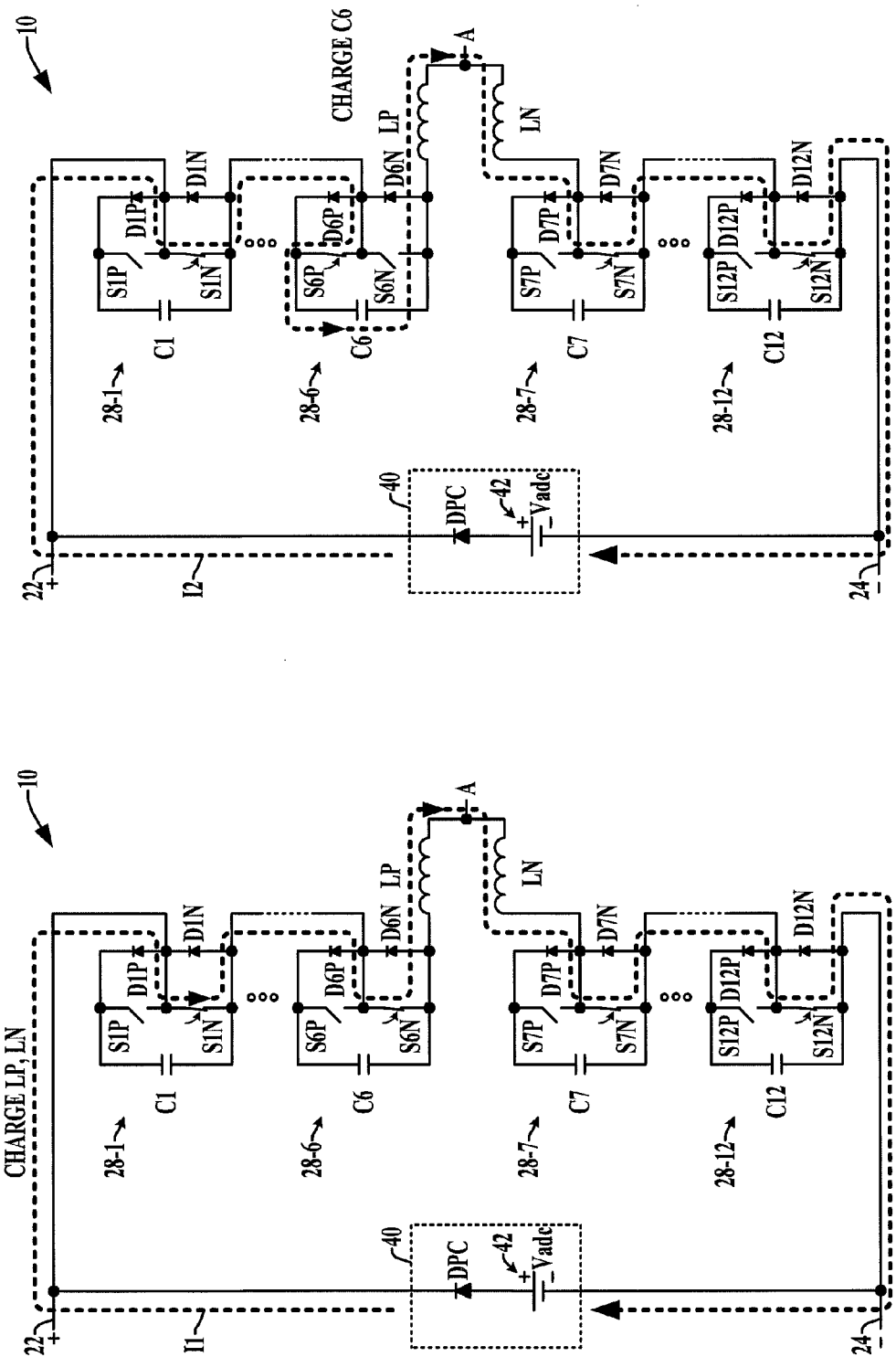

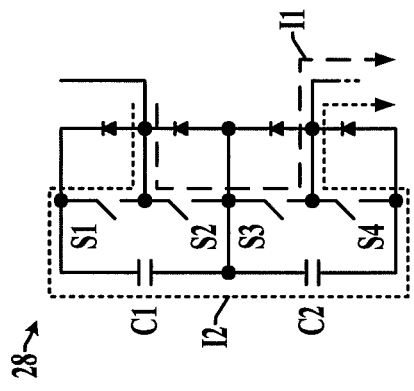
FIG. 15A
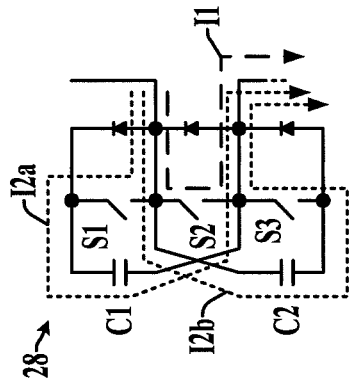
FIG. 15B
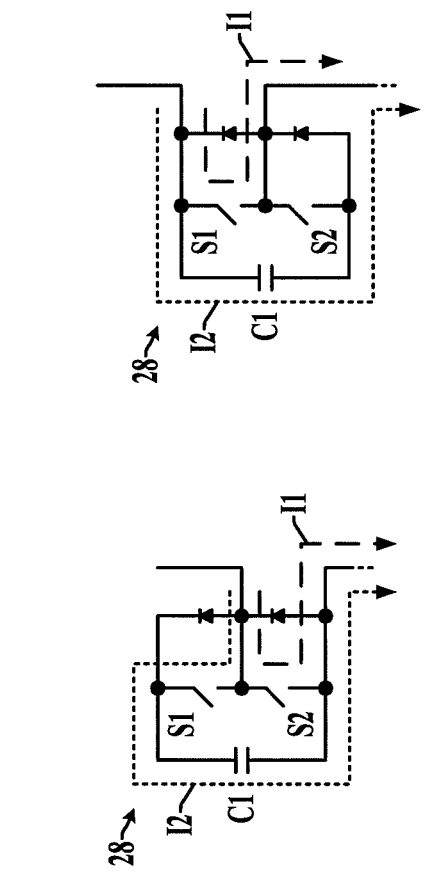
FIG. 16
FIG. 17
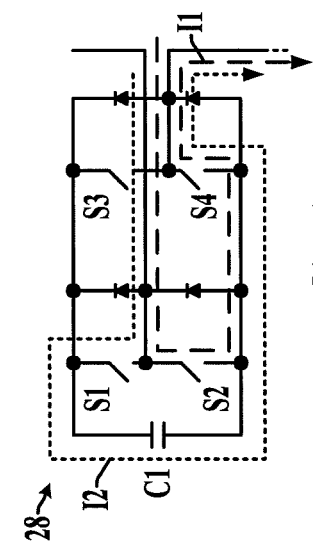
FIG. 18

MODULAR MULTILEVEL CONVERTER AND CHARGING CIRCUIT THEREFOR

BACKGROUND

The subject matter disclosed herein relates to power conversion, and more specifically to charging apparatus and methods for charging cell capacitors of a multilevel power converter.

SUMMARY

Methods and charging apparatus are presented for charging multilevel converter cell capacitors by applying an auxiliary DC voltage across converter DC bus terminals while one or more selected multilevel converter cells are alternately switched between a first state to bypass the selected cell or cells and a second state to charge the capacitor or capacitors of the selected cell via charging current from the auxiliary charging source.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIGS. 6 and 7 are schematic diagrams illustrating alternating pulse width modulated operation of a second selected cell for precharging the corresponding cell capacitor;

FIGS. 15A, 15B and 16-21 are schematic diagrams illustrating first and second switching states and corresponding current flow paths in different MMC cells.

DETAILED DESCRIPTION

Figure 1:
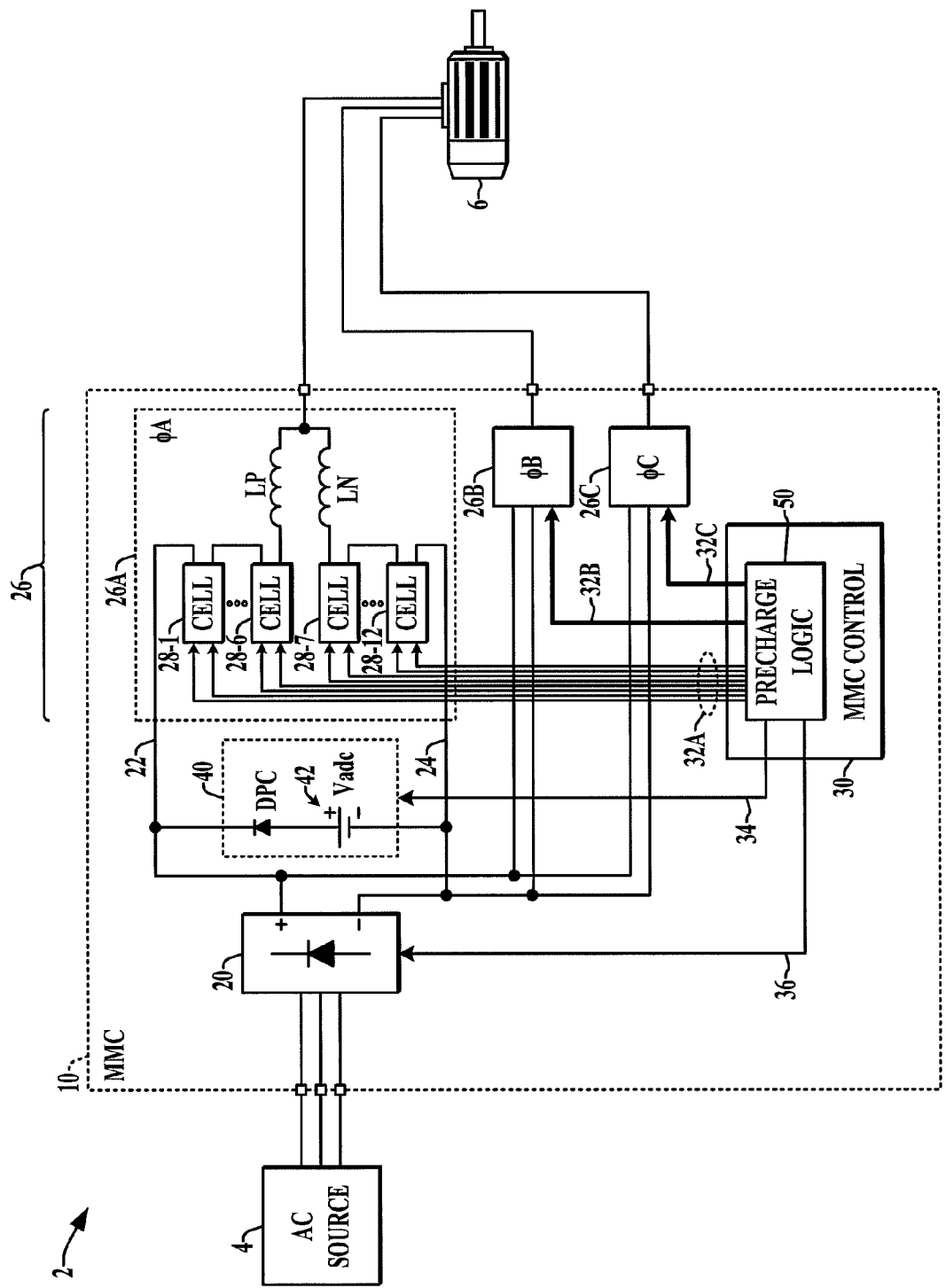
FIG. 1 is a schematic diagram illustrating a modular multilevel converter (MMC) motor drive with a low voltage precharging system for charging MMC cell capacitors.
Figure 3:
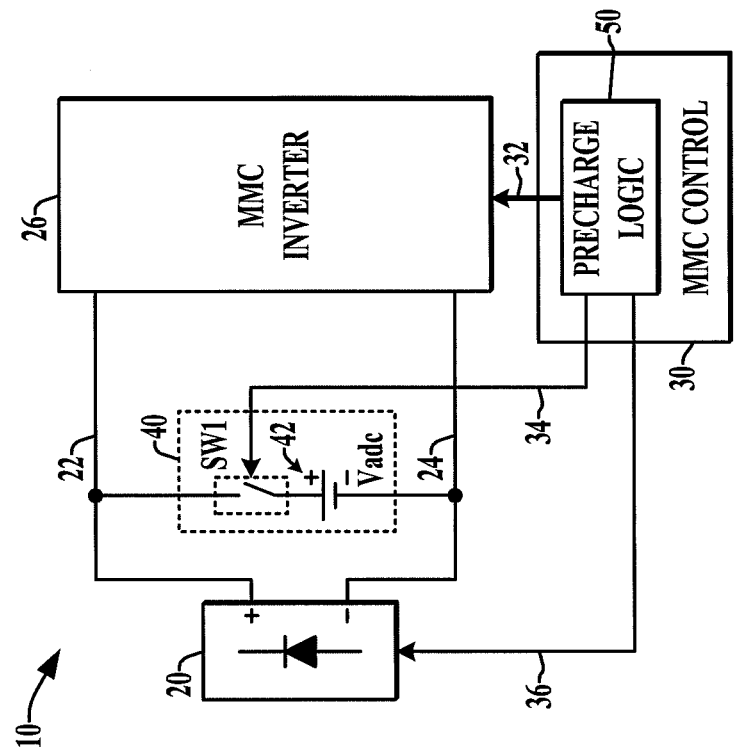
FIG. 3 is a schematic diagram illustrating a precharging system with a DC voltage supply and a switch for selective coupling with the DC bus.
Figure 2:
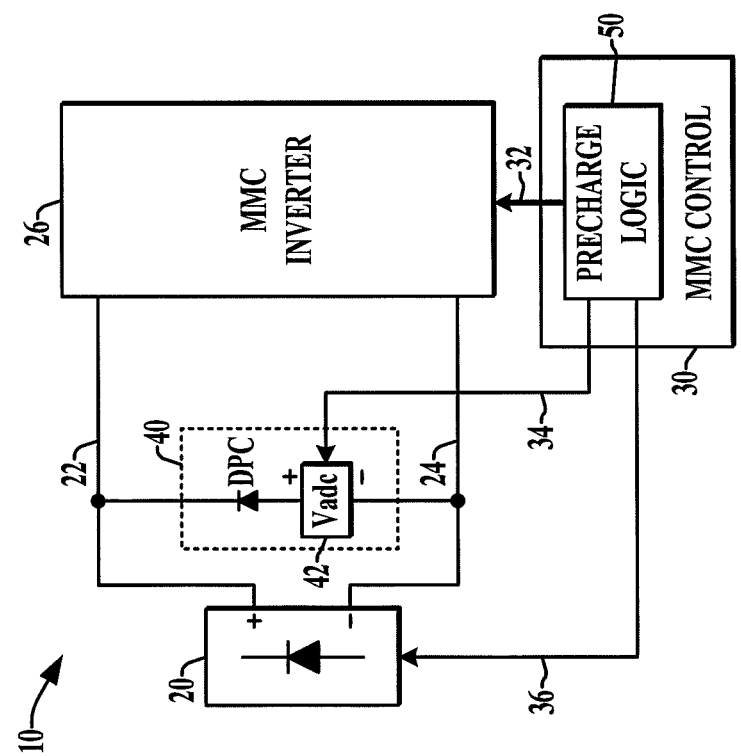
FIG. 2 is a schematic diagram illustrating a precharging system with a low voltage DC supply and a blocking diode coupled with a DC bus.

Referring initially to FIGS. 1-3, FIG. 1 shows a modular multilevel converter (MMC) 10 of a multilevel power conversion system 2, where the MMC 10 receives multiphase AC input power from an AC source or supply 4 and provides variable frequency AC output power to drive a motor load 6. The MMC 10, moreover, includes a rectifier circuit 20 rectifying the AC input power to provide DC bus power to first and second DC bus nodes 22 and 24. The system 10 includes three MMC inverters 26A, 26B and 26C providing corresponding three-phase output power to drive the motor load 6, where each of the inverter output phases or stages 26 is a modular multilevel design including multiple cells or modules 28 connected in a series circuit between the DC bus nodes 22 and 24, as well as positive and negative output inductors LP and LN connected from the series circuit to the corresponding inverter output terminal. In the illustrated example, each output phase inverter 26 includes 12 cells 28-1 through 28-12 connected in a series circuit between the positive DC bus node 22 and the negative DC bus node 24, with each of the phases or stages 26A, 26B and 26C of the multiphase inverter 26 receiving DC input power from the shared DC bus 22, 24 provided from the rectifier circuit 20. The details of the inverter stages 26B and 26C for the second and third output phases are similar to those specifically illustrated for the first phase "A", wherein the details are not shown for the second and third phases for ease of illustration. Any suitable rectifier 20 can be used in the MMC conversion system 10, for example, a single or multiphase diode rectifier circuit or an active rectifier 20. In this regard, the rectifier 20 may itself be constructed using one or more modular multi-level converters including two or more multilevel cells 28 connected between the DC bus nodes 22 and 24, and providing an AC terminal for connection to a corresponding input phase from the source 4.

The conversion system 2 can employ any suitable form or type of multilevel converter cell 28 as illustrated and described further below in connection with FIGS. 15A-21, with the individual cells 28 including first and second output terminals for connection with preceding and/or succeeding cells 28 in the corresponding series circuit. Moreover, the individual cells 28 can include any number of switching components and one or more cell capacitors. As shown in FIG. 1, moreover, the inverter AC output lines in certain embodiments include one or more inductors to connect with the driven load 6, where the illustrated example includes first and second inductors LP and LN, respectively, where the inductors LP, LN in this example are each connected between one of the cells 28 and the corresponding output node. As connected, therefore, the cells 28 form a series circuit coupled between the DC bus nodes 22 and 24, and the inductor or inductors LP, LN are connected between the series circuit and the corresponding output node.

The MMC 10 also includes a controller 30 (MMC control) providing switching control signal sets 32A, 32B and 32C for operating the individual cells 28 of the corresponding inverter stages 26A, 26B and 26C, respectively. The controller 30 may be any suitable hardware and/or processor circuitry, and may be programmable or configurable via corresponding software for execution in one or more processor elements including without limitation microprocessors, microcontrollers, programmable logic, FPGAs, etc. In operation, the conversion system 10 rectifies AC input power via the rectifier 20 to produce DC voltage across the DC bus nodes 22 and 24, and the DC bus circuit may include one or more bus capacitances (not shown). In addition, the multilevel converter 10 generates single or multiphase AC output voltages and/or currents via a multilevel inverter 26 for use in motor drives or other power conversion system applications. In the illustrated example, for instance, three inverter output stages 26A, 26B and 26C are provided for generating three-phase output voltages to drive the motor load 6, although other single or multiphase embodiments are possible having more or less than three outputs. In addition, while the illustrated MMC converter 10 receives and rectifies a multiphase AC input, other embodiments are possible including a single phase or other multiphase input rectifier 20, whether passive or active.

Multilevel power conversion systems such as the MMC converter 10 are particularly advantageous where relatively large output voltages are required. Multilevel voltage source converter architectures include flying or switched capacitor designs (FC), neutral point clamped (NPC) configurations, MMCs and cascaded and hybrid cell topologies 28 such as cascaded H-bridge (CHB) designs. These and other forms of multilevel converters may be operated using space vector modulation (SVM) or other pulse width modulation (PWM) techniques employed in the converter controller 30 to generate the switching control signals 32 applied to the individual multilevel converters stages 26 and cells 28 thereof, for example, to provide variable frequency, variable amplitude multiphase output voltages to drive a motor or other load 6. In this regard, multilevel converters are particularly advantageous for medium-voltage high-power conversion applications; such as motor drives, micro-grids and distributed generation systems, and provide improvements over two-level converter architectures with respect to the capability for reducing harmonic distortion of the AC-side waveforms, to reduce dv/dt switching stresses, to reduce switching losses, and to minimize or even eliminate the need for an interface transformer. However, the individual cells 28 of the multilevel inverter 26 (and of any multilevel rectifier implementations 20) include cell capacitors for generating corresponding output voltages, and proper operation of the system 10 is facilitated by properly charging (e.g., precharging) the cell capacitors prior to operation to drive the load 6. In the past, this was accomplished via complicated charging circuitry including current-limiting resistors and associated switching circuits.

As further shown in FIG. 1, the system 10 includes a charging system 40, 50 for charging cell capacitors of the system 20, 26, including a charging circuit 40 coupled with the DC bus nodes 22 and 24 with a DC voltage source 42 and one or more blocking components, such as one or more precharging diodes DPC (FIGS. 1 and 2) and/or one or more switches SW1 (FIG. 3) coupled in series with the voltage source 42 between the DC bus nodes 22 and 24. Any suitable charging source can be used, including without limitation any rectified AC source, external DC source or other form of isolated DC source including without limitation the illustrated DC voltage supply 42. Moreover, various embodiments can employ one or more active semiconductors (e.g., SCRs) as a blocking component coupled with the charging source 42. The charging source and the charging circuit operate in a first mode for precharging one or more cell capacitors, with the voltage source 42 providing a DC voltage which is less than a nominal cell capacitor voltage of the power conversion system. In this mode, moreover, the at least one blocking component DPC, SW1 allows charging current to flow from the DC voltage source (e.g., referred to herein as an auxiliary voltage source or charging source) 42 to one or more cells 28 of the converter 10 via the DC bus nodes 22 and 24 in the series circuitry formed by the interconnection of the various cells 28. In addition, the charging system includes a precharge logic component or circuit 50 which may be implemented in the MMC controller 30 or which may be separate therefrom. In operation in the first mode for precharging one or more cell capacitors, the precharge logic component 50 of the controller 30 alternates the switching states of one or more selected cells 28 between a first state to bypass the selected cell(s) 28 while precharging current flow builds up in the inductor or inductors LP, LN, as well as a second state to charge the cell capacitor(s).

In this manner, the precharging of the cell capacitors in the multilevel converter 10 is accomplished from the DC side (e.g., via the DC bus nodes 22 and 24), and the use of an auxiliary voltage source having a voltage less than the nominal cell capacitor voltage mitigates or avoids the need for precharging resistors and associated switching circuitry. Moreover, certain implementations may employ the existing cell switching circuitry with the additional provision of the precharge logic 50 as described further herein. In this regard, since the normally high DC voltage output level provided by the rectifier 20 is not used in precharging the individual cell capacitances, various embodiments do not need any precharging or current-limiting resistance, where the output inductors LP, LN can be employed during precharging, with the charging circuitry being configured essentially as a buck or boost converter for charging one or more capacitors of the cells 28.

The precharging system and circuitry 40, 50, moreover, may be activated or used at any suitable time and/or operating condition, for example, at system power up before driving the motor load 6 and/or any other suitable situation, as explained in further detail below in connection with FIG. 22. In addition, as shown in FIG. 1, the precharge logic 50 of the controller 30 may provide one or more control or enable signals 34 for selective operation of the charging circuit 40 and/or an enable/disable control signal or signals 36 to selectively activate or deactivate the rectifier 20. In this manner, the controller 30 may selectively deactivate the rectifier 20 and activate the auxiliary voltage source 42 to provide an auxiliary DC voltage Vadc less than the nominal cell capacitor voltage across the DC bus nodes 22 and 24 in the first mode of operation for precharging one or more cell capacitors. The selective activation of the precharging voltage source 42, moreover, can be implemented by any suitable means, including without limitation the provision of a switch or switches SW1 for the blocking component of the charging circuit 40 (e.g., as shown in FIG. 3)) operated according to a switching control signal 34 from the precharge logic 50, and/or the use of a selectively actuatable voltage source 42 operated according to a precharge control signal 34 as shown in FIG. 2. In one simple implementation, as shown in FIG. 1, a simple blocking diode DPC can be used in the charging circuit 40, and the auxiliary voltage source 42 may, but need not be, deactivated after precharging since the auxiliary voltage Vadc provided by the source 42 is less than the nominal cell capacitor voltage in normal load-driving operation of the system 10. In addition, the rectifier 20 may be selectively activated and deactivated using any suitable means, including without limitation a contactor or other switching circuit configured to disrupt provision of AC input power from the AC source 4 to the rectifier 20 (e.g., for a passive rectifier circuit 20), or the MMC controller 30 may simply discontinue providing switching control signals to an active rectifier 20 during the first mode of operation for precharging the MMC inverter cell capacitors.

Figure 22:
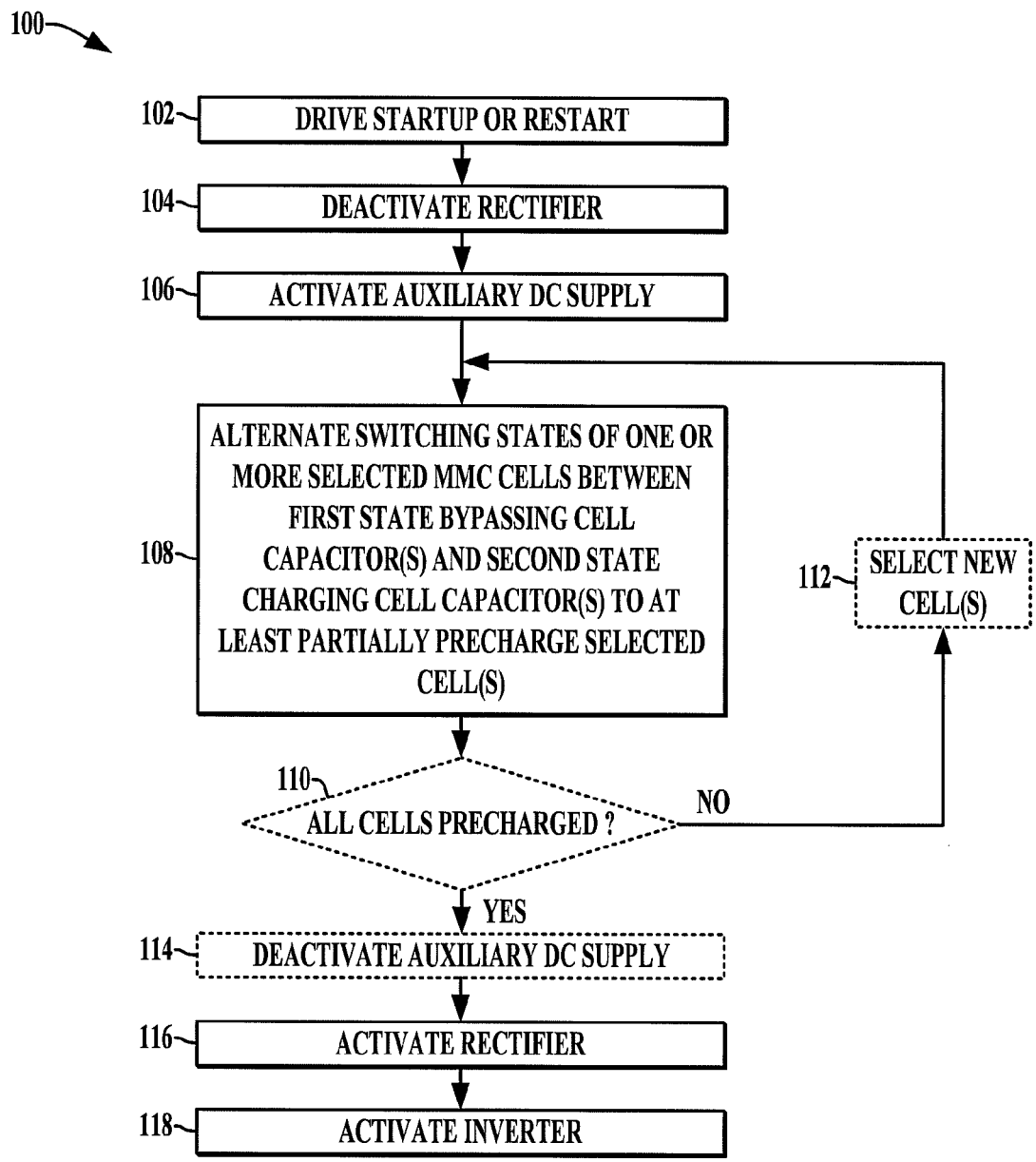
FIG. 22 is a flow diagram illustrating an exemplary method for charging cell capacitors of a multilevel power conversion system.

Referring also to FIG. 22, an example process or method 100 is illustrated for charging or precharging cell capacitors of a multilevel power conversion system 20, 26, which may be implemented in any suitable fashion, for example, using the precharge logic 50 and the charging circuit 40 of FIGS. 1-3. The process 100 is illustrated and described below in the form of a series of acts or events, although the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. In addition, not all illustrated steps may be required to implement a process or method in accordance with the present disclosure, and one or more such acts may be combined. The illustrated method 100 other methods of the disclosure may be implemented in hardware, processor-executed software, processor-executed firmware, programmable logic, or combinations thereof, such as in the controller 30, and may be embodied in the form of computer executable instructions stored in a tangible, non-transitory computer readable medium, such as in an electronic memory operatively associated with one or more processor elements of the controller 30 in the example of FIG. 1. Moreover, although illustrated and described as being implemented in the controller 30, any suitable processor-based system may be used to implement the method 100, wherein the various concepts of the present disclosure are not limited to implementation in a programmable logic controller, motor drive controller 30, or in any specific host system.

Beginning at 102 with drive start up or restart (or other suitable condition or situation in which it is desirable to charge or precharge one or more cell capacitors of a multilevel power conversion system), the process 100 may optionally include deactivating the rectifier 20 at 104 and selectively activating the auxiliary DC supply 42 at 106 in FIG. 22. At 108, the controller 30 alternates the switching states of one or more selected cells 28 between a first state bypassing one or more cell capacitors, and a second state charging one or more cell capacitors to at least partially precharge one or more selected cells 28. The alternating operation at 108 may be implemented using any suitable technique, including without limitation pulse width modulation or PWM control. In certain implementations, moreover, the controller 30 implements the first state by coupling first and second output terminals of at least one selected cell 28 to one another to essentially bypass the cell 28, and implements the second state to couple one or more cell capacitors of the selected cell(s) between the first and second cell output terminals to charge the corresponding cell capacitor(s). In addition, as described below, the second state may be divided into two or more phases for separately charging two or more capacitors of a given type of cell 28.

In addition, the controller 30 in various embodiments may perform the alternating switching control at 108 in the first mode in order to selectively charge the selected cells 28 one and a time as further described at 110 and 112 in FIG. 22, or two or more selected cells may be charged concurrently. In various implementations, moreover, the controller 30 may operate at 108 to charge all cells 28 concurrently. In this regard, a determination is made at 110 in one possible embodiment as to whether all cells 28 have been precharged, and if not (NO at 110), a new cell or group of cells 28 is selected at 112, and the controller 30 again alternates the switching states of the presently selected cell or cells 28 at 108. This process continues at 108, 110 and 112 until all the cells 28 have been precharged (YES at 110), and the controller 30 may then optionally deactivate the auxiliary DC supply 42 at 114 before activating the rectifier 20 at 116 and activating the inverter 26 at 118 to begin normal motor drive operation. As further described below in connection with FIG. 14, moreover, the process 100 and the precharging system 40, 50 may also be used to charge or precharge cell capacitors of a multilevel inverter 26 and/or a multilevel rectifier 20 in certain embodiments.

Figure 5:
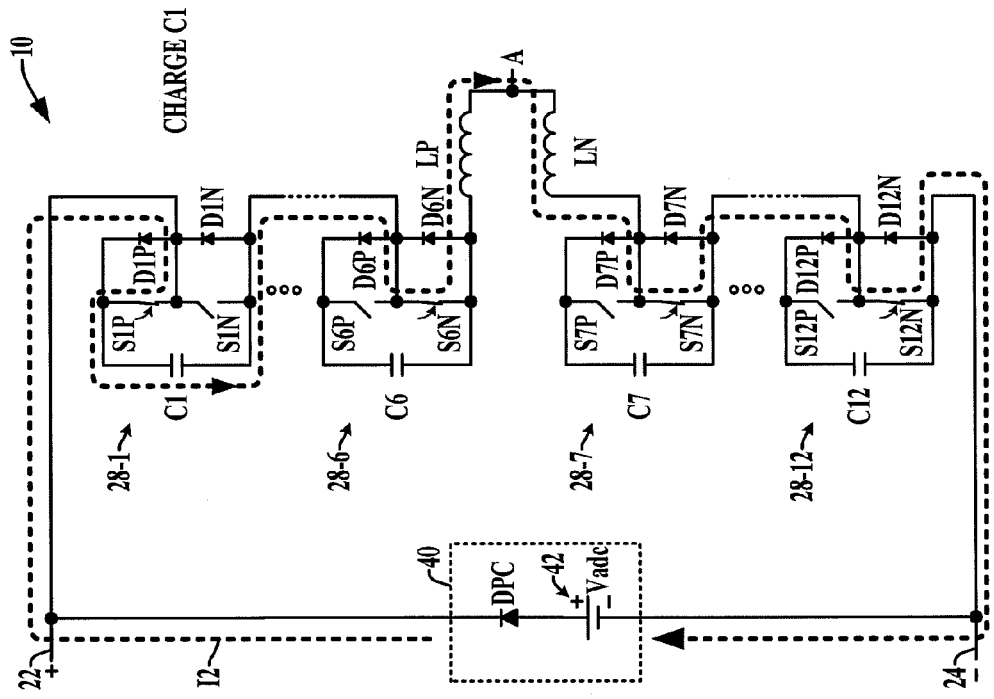
FIGS. 4 and 5 are schematic diagrams illustrating alternating pulse width modulated operation of a selected cell of a MMC inverter in first and second switching states for precharging the cell capacitor.
Figure 4:
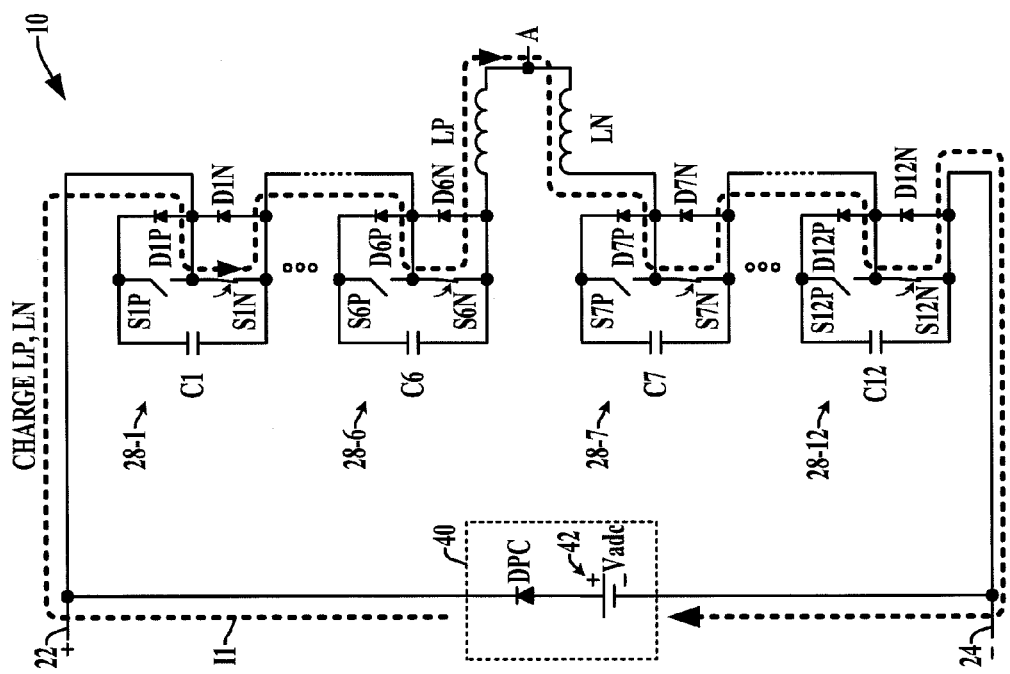
Figure 9:
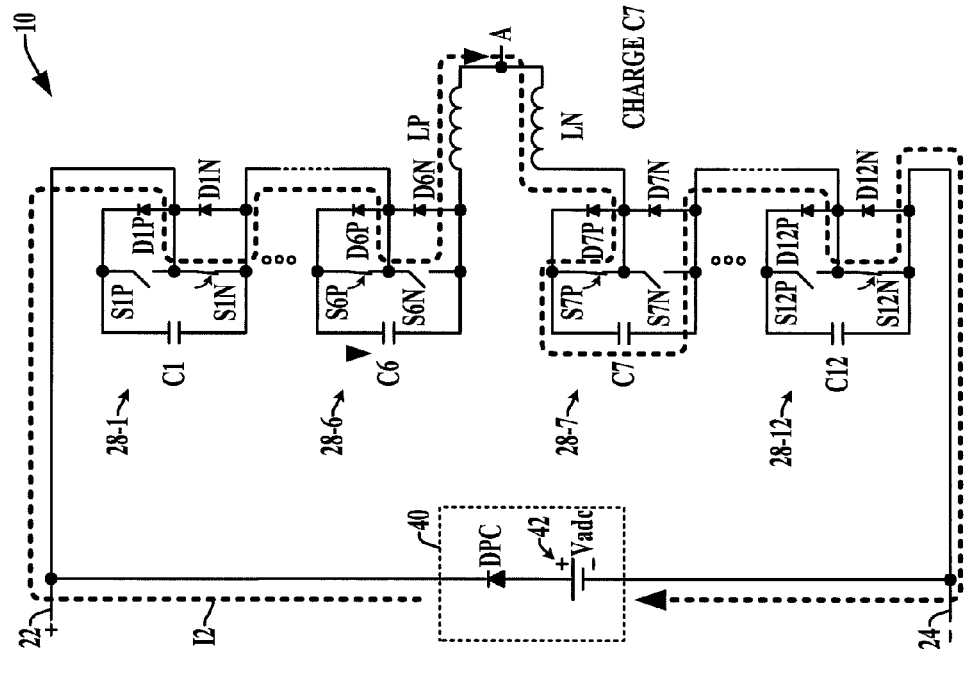
FIGS. 8 and 9 are schematic diagrams illustrating alternating pulse width modulated operation of another cell in the MMC inverter for precharging the corresponding cell capacitor.
Figure 10:
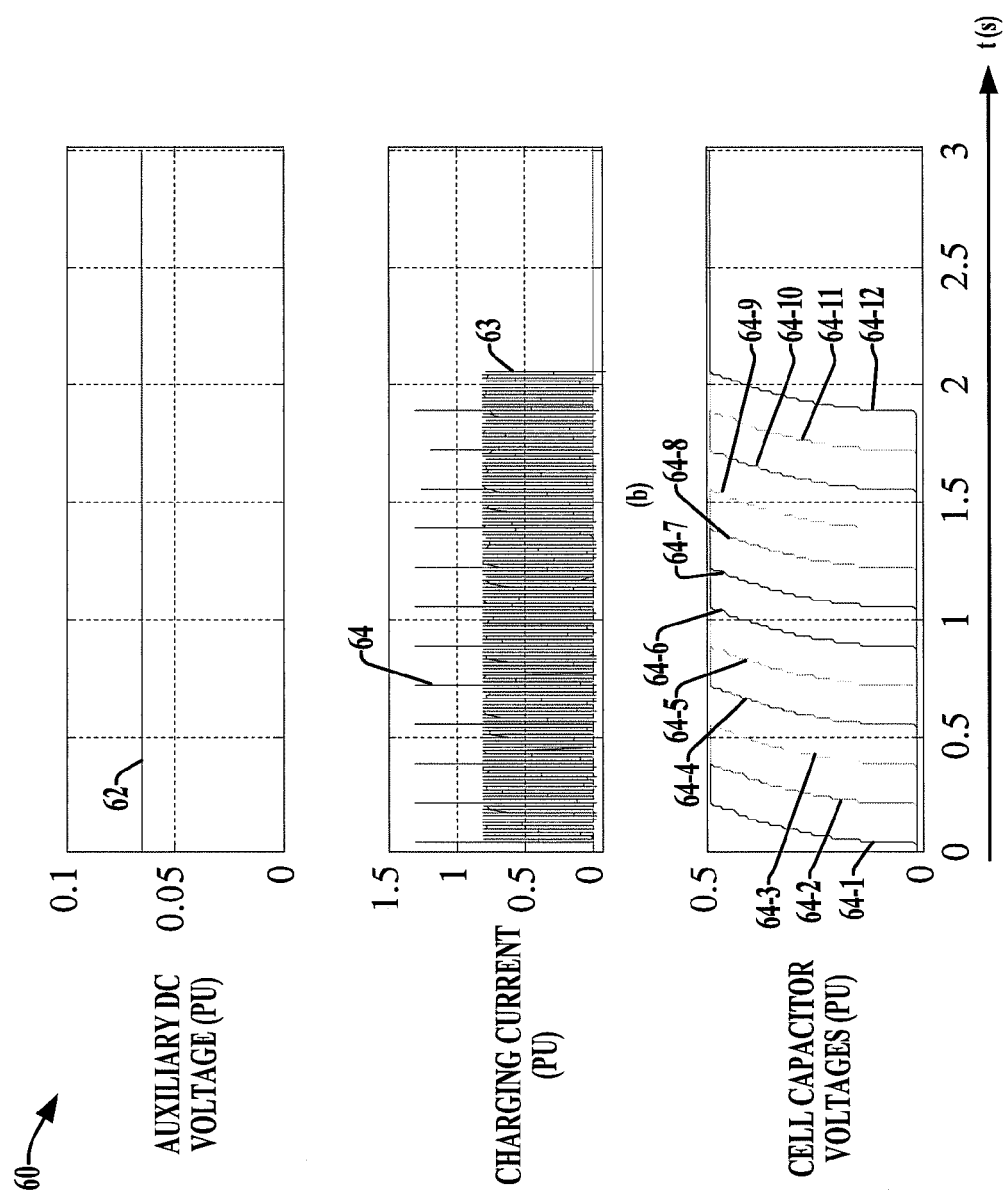
FIG. 10 is a graph illustrating auxiliary DC voltage, charging current and cell capacitor voltage curves during sequential charging of individual cells of an MMC inverter.

Referring also to FIGS. 4-10, operation of the charging system 40, 50 and the process 100 are further illustrated for an implementation providing for individually charging cell capacitors in one phase (phase A) of the multilevel inverter 26 of FIG. 1 in sequence, where FIGS. 4-9 illustrate alternating pulse width modulation operation of a selected cell 28 of the inverter 26 in first and second switching states for precharging the corresponding cell capacitor. In addition, FIG. 10 shows a graph 60 with auxiliary DC voltage, charging current and cell capacitor voltages during this sequential cell capacitor charging example. FIGS. 4 and 5 show the first and second states with respect to initial charging of a first capacitor C1 of a first cell 28-1 in the "A" phase of the multiphase inverter 26 using the corresponding positive and negative inverter inductors LP and LN. With the main rectifier deactivated (rectifier 20 in FIG. 1), the auxiliary DC voltage source 42 is activated and is able to provide charging current along the path I1 shown in dashed line form in FIG. 4 by forward biased operation of the precharging diode DPC.

FIG. 4 illustrates the first state in which the controller 30 (FIG. 1) provides switching control signals 32 in order to bypass each of the cells 28-1 . . . 28-12 in the example where the series circuit of the "A" phase of the multilevel inverter 26 includes 12 series connected cells 28. In this regard, the figures show only cells 28-1, 28-6, 28-7 and 28-12 for ease of illustration, and it will be appreciated that the concept can be employed in multilevel converter architectures having any number of two or more multilevel cells 28 connected in a series circuit. As seen in FIG. 4, in this first state, each of the cells 28 has the corresponding negative or lower switches (e.g., S1N, S6N, S7N . . . S12N) closed while the corresponding positive or upper switches (e.g., S1P . . . S12P) are opened so that the current flowing from the auxiliary charging source 42 bypasses the corresponding cell capacitors in flowing from the positive DC node 22 through the closed bypass switches S1N . . . S12N, and through the inductors LP and LN and returning through the lower or negative DC bus node 24 as shown by the first current path I1 in FIG. 4. During this first state, the charging current from the DC source 42 builds up current flow in the inductors LP and LN similar to switching operation of a boost converter.

FIG. 5 illustrates the alternate switching operation in the second state, where the switching states of the non-selected cells 28-2 . . . 28-12 remain the same as in FIG. 4, and the upper switch S1P of the selected cell 28-1 is closed while the lower switch S1N is opened. In this second state, current from the auxiliary DC supply 42 flows along the path I2 as shown in FIG. 5, where the current flows through the cell capacitor C1 for charging or precharging of the selected cell 28-1 as shown. It is noted that the presence of the output inductors LP and LN serve to limit the charging current flowing through the cell capacitor C1, and hence the alternating switching control provided by the controller 30 can be employed, in conjunction with the lower DC voltage level of the source 42 (relative to the nominal cell capacitor voltage) in order to avoid or mitigate the need for any precharging (e.g., current-limiting) resistances and associated switching circuitry in the system 10. Thus, unlike other DC bus-based precharging approaches using DC voltage supplied by the rectifier 20, the charging systems and techniques of the present disclosure advantageously avoid the need for such extra components. In operation, the controller 30 alternates between the first and second switching states as shown in FIGS. 4 and 5 in order to charge (fully or at least partially) the capacitor C1 of the selected multilevel converter cell 28-1. It will be appreciated that modification of the pulse width modulation timing and/or the overall charging time and auxiliary voltage source voltage level can be used by the controller 32 selectively charge any individual cell capacitor of the system 10 to any desired voltage, where the precharged voltages of different cells and corresponding cell capacitors may, but need not be the same in all embodiments.

Figure 8:
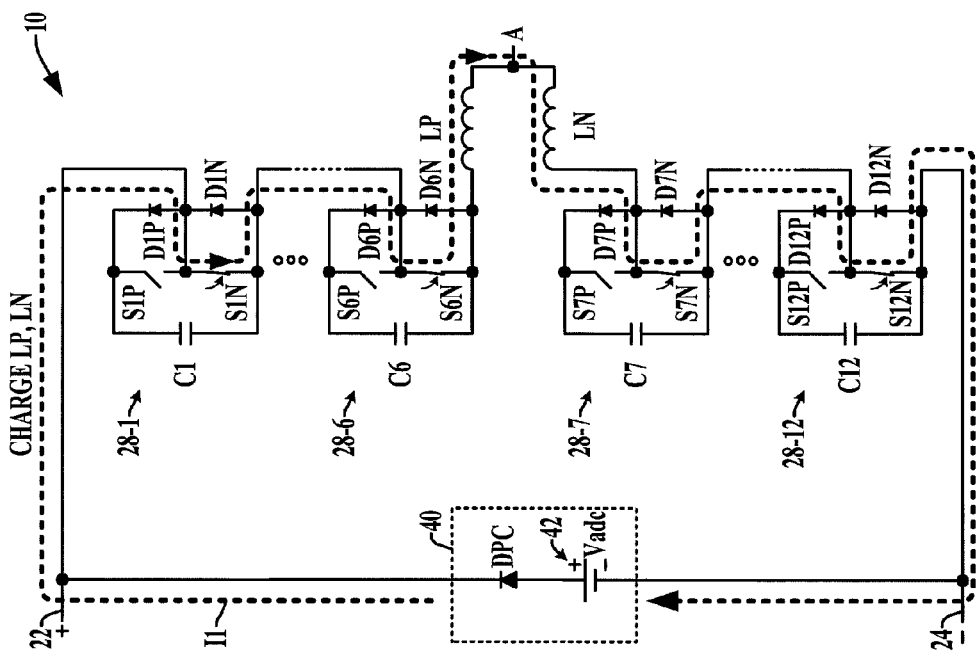

Referring also to FIGS. 6-10, this sequential charging of the cell capacitors one at a time continues in any desired selection order, where FIGS. 6 and 7 illustrate first and second switching state alternation for a selected cell 28-6, and FIGS. 8 and 9 illustrate alternation between the first and second switching states where the seventh cell 28-7 is selected. Referring also to the graph 60 in FIG. 10, this example precharging approach is performed in one embodiment with a generally constant auxiliary DC voltage shown by the curve 62 in per-unit scale (PU), where the per-unit charging current curve 63 is also shown, including initial charging peaks or spikes 64 when the controller 30 initially begins alternating operation for a different selected cell 28. FIG. 10 further illustrates corresponding cell capacitor voltage curves 64-1, 64-2, 64-3, 64-4, 64-5, 64-6, 64-7, 64-8, 64-9, 64-10, 64-11 and 64-12 corresponding to the capacitors of the $1^{st}$ through $12^{th}$ multilevel converter cells 28-1 . . . 28-12, showing the gradual increase in the cell capacitor voltage for each successive cell, where the peaks or spikes 64 in the charging current curve 63 correspond with the controller 30 switching to the next selected cell 28.

Figure 12:
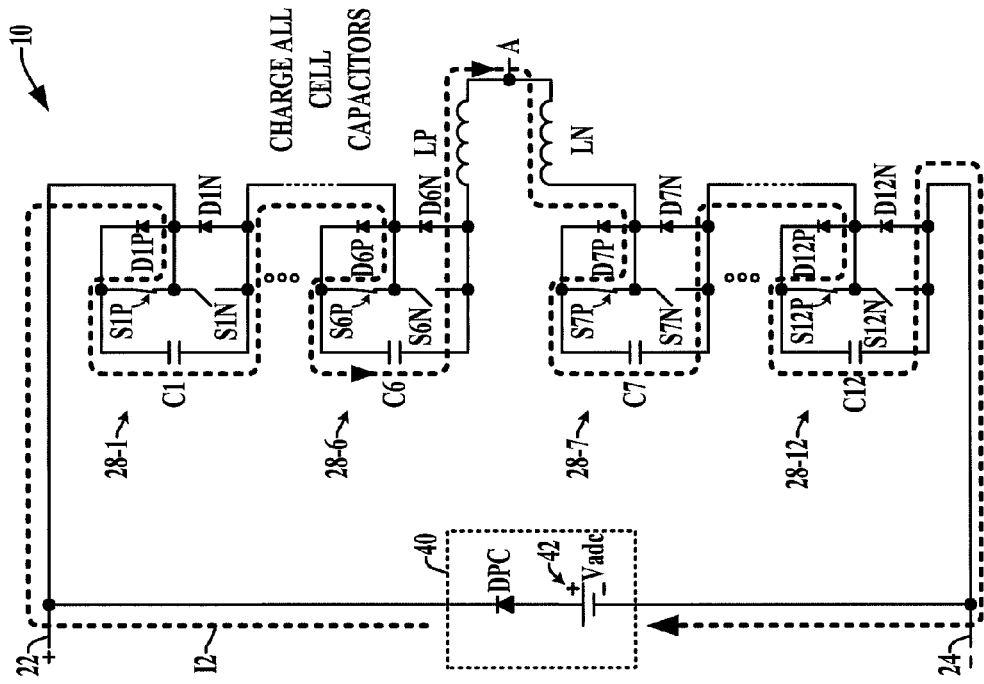
FIGS. 11 and 12 are schematic diagrams illustrating alternating pulse width modulated operation of all cells of the MMC inverter in first and second switching states for concurrently precharging the cell capacitors.
Figure 11:
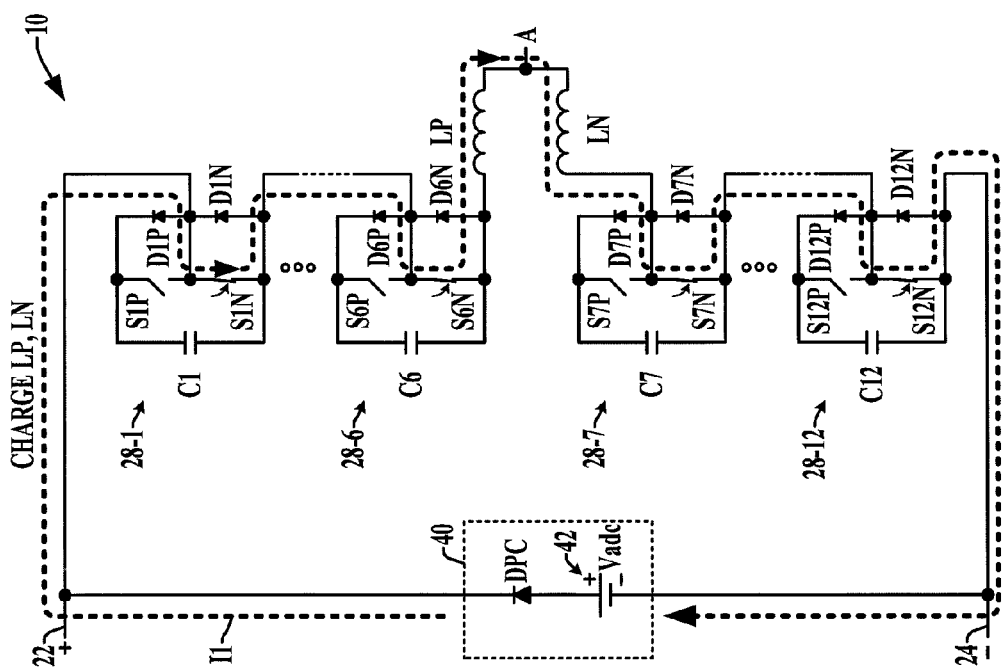
Figure 13:
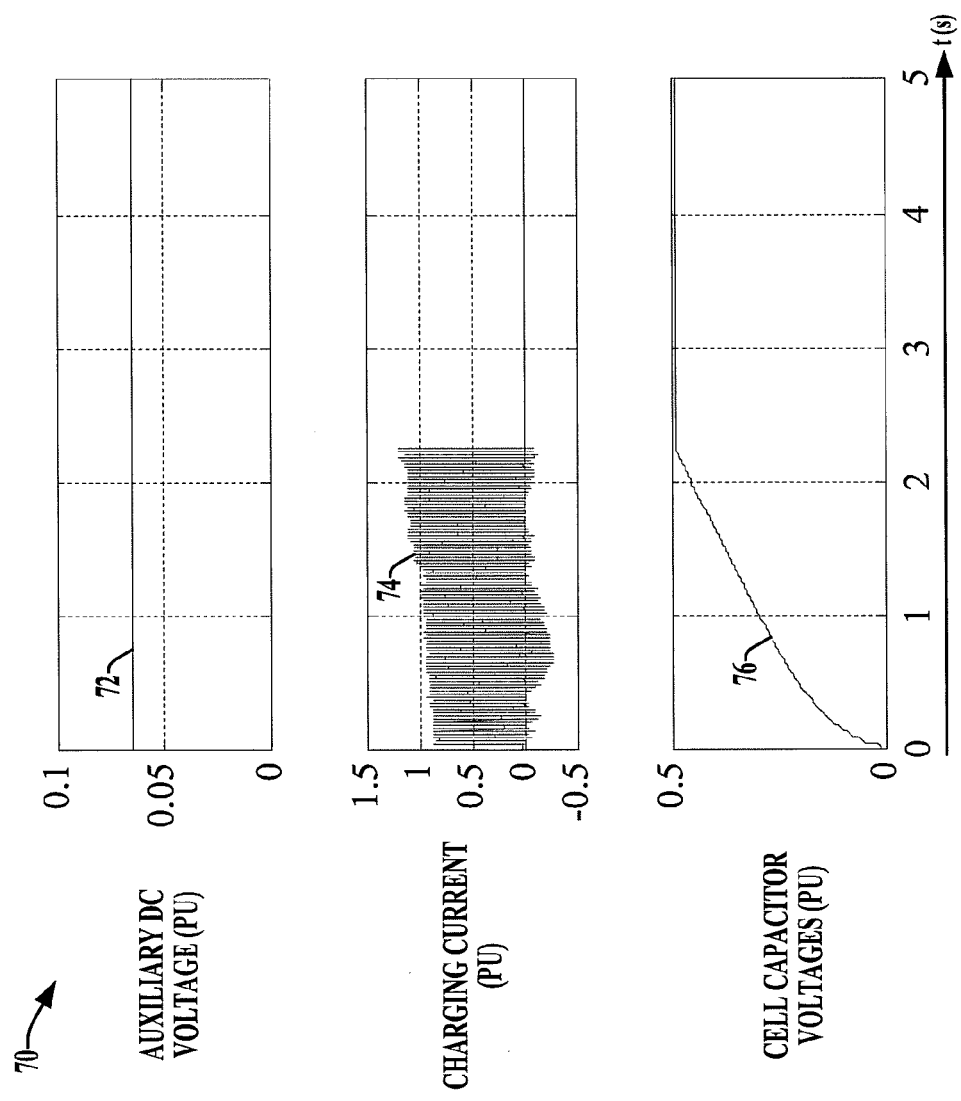
FIG. 13 is a graph illustrating auxiliary DC voltage, charging current and cell capacitor voltage curves during concurrent charging of the cell capacitors of the MMC inverter.

Referring also to FIGS. 11-13, the controller 30 in certain embodiments is operative in the first mode to charge two or more cells 28 of the multilevel converter 10 concurrently. FIG. 11 illustrates the first state, again with all the cells 28 bypassed, and FIG. 12 illustrates the second state implemented by the controller 30, in this case with capacitors of all the cells being concurrently charged (all cells 28 selected). As in the above situation, the first state in FIG. 11 bypasses all the cells 28-1 . . . 28-12 and allows current flow along path I1 to build up current flow in the output inductors LP and LN, and the second state shown in FIG. 12 provides current flow along the path I2, in this case with the upper switches closed and the lower switches opened for all the cells 28-1 . . . 28-12. This switching operation connects the corresponding cell capacitors C1 . . . C12 in the series circuit along with the inductors LP and LN, thus charging the selected cell capacitors concurrently. FIG. 13 provides a graph 70 showing the auxiliary DC voltage curve 72, a constant level in this case, along with the per-unit charging current curve 74 which is generally within a fairly constant range, and alternates according to the alternating switching control signals 32 provided by the controller 30 in the first (precharging) mode. In addition, FIG. 13 illustrates the per-unit cell capacitor voltages with a curve 76, where the capacitor voltages are generally equal and increase as the concurrent charging operation continues in this non-limiting example.

Figure 14:
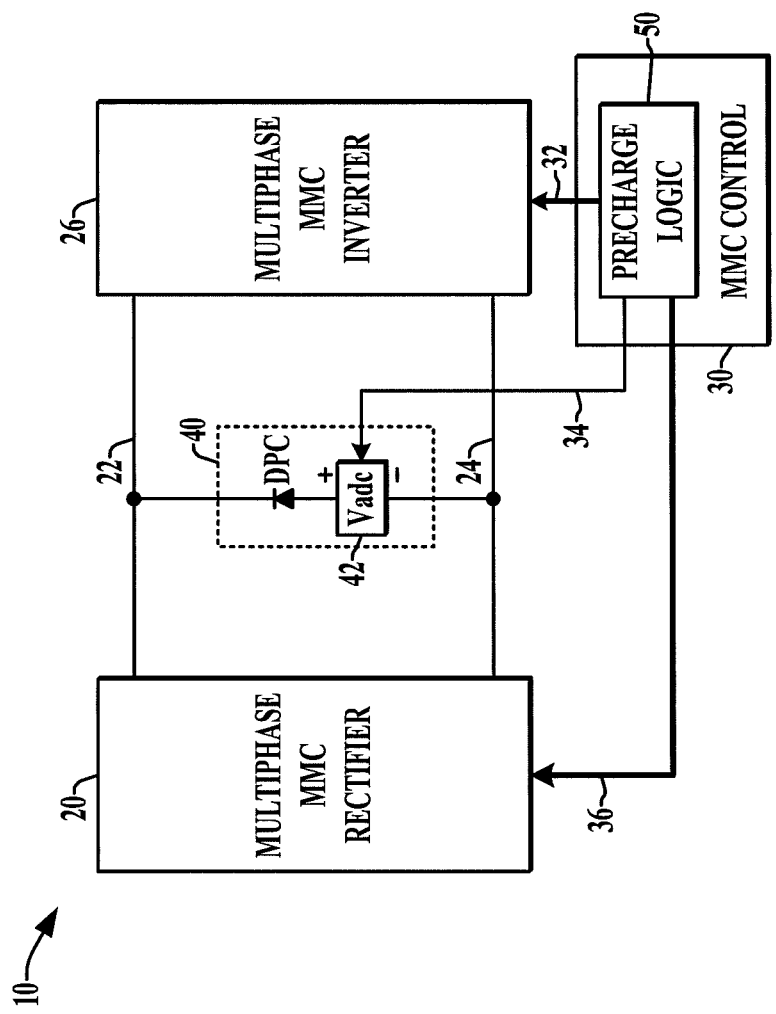
FIG. 14 is a schematic diagram illustrating a precharging system with a DC voltage supply and a blocking diode for precharging cell capacitors of an MMC rectifier and an MMC inverter of a motor drive.

Referring also to FIG. 14, as previously mentioned, the charging/precharging operation of the system 40, 50 and the above described process 100 (FIG. 22) can be employed for charging/precharging cell capacitors of the multilevel inverter 26 as well as for charging/precharging cell capacitors of a multilevel switching rectifier 20, with the precharge logic 50 in such case also providing switching control signals 36 to the cells 28 of the rectifier 20 according to the above-described techniques. In this manner, a power conversion system 10 including a multilevel (e.g., MMC) rectifier 20 as well as a multilevel inverter 26 can be precharged in a single operation and/or cell capacitors of selected groups of cells 28 of the rectifier 20 and the inverter 26 can be concurrently charged/precharged using a single auxiliary voltage source 42 and corresponding blocking device (e.g., diode DPC and/or switch SW1) under control of the precharge logic 50 as generally described above. The controller 30 in various embodiments can initially charge cell capacitors of the rectifier 20 (individually, or in concurrently-charged groups, or all at once, etc.), and then charge the cell capacitors of the inverter 26, in any desired fashion collectively or individually. In other embodiments, the reverse can be implemented, with the controller 30 charging capacitors of the inverter 26 and then charge capacitors of the rectifier. In further embodiments, moreover, the controller 30 can charge cell capacitors (individually, or in groups, or all at once) for both the rectifier 20 and the inverter 26 at the same time.

Referring also to FIGS. 15A-21, the disclosed charging apparatus and processes can be employed with any form or type of multilevel converter cells 28. FIGS. 15A-21 illustrate the above-described first and second switching states and corresponding current flow paths I1 and I2, respectively, in different MMC cells. FIG. 15A illustrates a cell 28 having a single capacitor C1 and a pair of switches S1 and S2 as seen in the examples of FIGS. 4-9, where operation of the switches selectively provides for current flow through the first path I1 with S2 closed (dashed line in FIGS. 15-21), as well as the dotted-line path I2 (S1 closed), where one simple implementation uses a single switching control signal 32 from the controller 30 for the cell 28 to selectively activate only one of the switches at any given time. FIG. 15B illustrates a variation on the cell architecture of FIG. 15A, in which the cell capacitance C1 is charged along the path I2 (e.g., where switch S2 may be closed), and the cell is bypassed along the path I1 by closing S1. FIG. 16 illustrates a three-level cell design 28, where the first state provides for current flow along the path I1 with S2 and S3 closed in order to bypass the cell 28, and the second state provides for current flow along the path I2 to concurrently charge both cell capacitors C1 and C2 by closing S1 and S4 (while S2 and S3 are opened). FIG. 17 shows a 3-level (H-bridge) cell structure using a single cell capacitor C1 along with four switches S1-S4. In this case, one possible implementation provides for bypassing the cell 28 for current flow along the path I1 by closing S2 and S4, and then alternate operation in the second state for conduction along the path I2 in order to charge the capacitor C1 with S1 and S4 closed.

Figure 20:
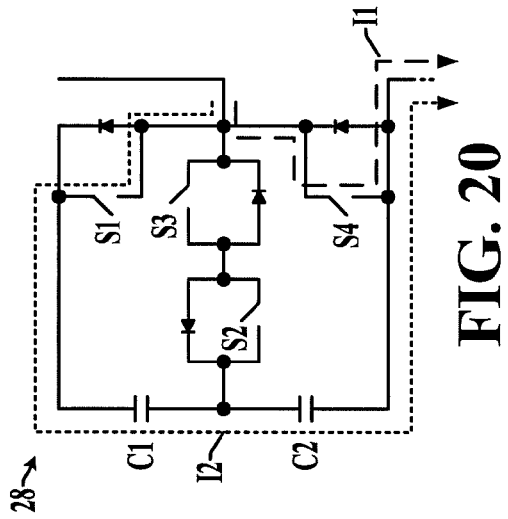
Figure 19:
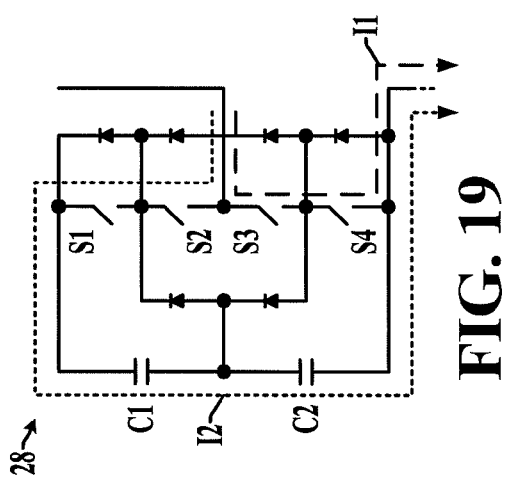
Figure 21:
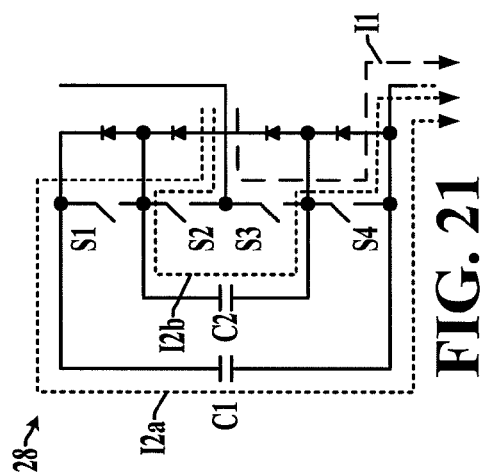

Another example is shown in FIG. 18, for a cell 28 having three switches S1-S3 and two cell capacitors. In this example, the controller 30 builds up current flow in the output inductor(s) in the first state with current flowing along the path I1 by closing S2, and then closes S1 while opening S2 and S3 to charge the first capacitor C1 with current flowing along the path I2a. In this case, moreover, the controller 30 implements a second phase of the second state to charge C2 via current flow along the path I2b by opening S1 and S2 and closing S3. FIG. 19 illustrates yet another non-limiting example cell configuration 28 with switches S1-S4 and two cell capacitors C1 and C2. In this case, the cell is bypassed in the first state for current flow along the path I1 by closing S3 and S4, and the cell capacitors C1 and C2 can be concurrently charged via current flow along the path I2 by closing S1 and S2. In the example of FIG. 20, the cell 28 can be bypassed by closing S4 for current flow along the path I1, and both capacitors C1 and C2 can be concurrently charged via current flow along the path I2 by closing S1. FIG. 21 illustrates yet another non-limiting example cell 28 with four switches and two cell capacitors. In this case, the first state is implemented by closing S3 and S4 to bypass the cell 28. The second state may be implemented with first and second phases, where the controller 30 closes S1 and S2 for current flow to charge C1 along the path I2a, and then a second phase for charging C2 along the current path I2b by closing S2 and S4. It will be appreciated that a variety of different switching patterns can be used by operation of the controller 30 in order to alternately place one or more selected cells 28 in a first state to bypass the cell 28 and build up current flow in the inductor, and then in a second state to charge at least one cell capacitor of the selected cell 28, where the second switching state of the selected cell or cells 28 can include multiple phases.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A charging system for charging cell capacitors of a multilevel power conversion system, comprising:
a charging circuit coupled with first and second DC bus nodes of a multilevel power conversion system, the charging circuit comprising:
a charging source operative in a first mode to provide a DC voltage less than a nominal cell capacitor voltage of the multilevel power conversion system, and
at least one blocking component coupled in series with the charging source between the first and second DC bus nodes and operative in the first mode to allow charging current to flow from the charging source to cells of the multilevel power conversion system; and
a controller operative in the first mode to alternate switching states of at least one selected cell of the multilevel power conversion system between a first state to bypass the at least one selected cell and build up current flow in an inductor of the multilevel power conversion system), and a second state to charge at least one cell capacitor of the at least one selected cell.

2. The charging system of claim 1, wherein the individual cells of the multilevel power conversion system include first and second output terminals for connection with preceding and succeeding cells in a series circuit, and wherein the controller is operative in the first mode to alternate the switching states of the at least one selected cell between the first state to bypass the at least one selected cell by coupling the first and second output terminals of the at least one selected cell to one another, and the second state to couple the at least one cell capacitor between the first and second output terminals of the at least one selected cell to charge the at least one cell capacitor.

3. The charging system of claim 2, wherein the controller is operative in the first mode to charge selected cells of the multilevel power conversion system one at a time.

4. The charging system of claim 2, wherein the controller is operative in the first mode to charge at least two selected cells of the multilevel power conversion system concurrently.

5. The charging system of claim 2, wherein the controller is operative in the first mode to charge all cells of the multilevel power conversion system concurrently.

6. The charging system of claim 2, wherein the controller is operative in the first mode to charge at least one cell of a multilevel inverter of the multilevel power conversion system.

7. The charging system of claim 6, wherein the controller is operative in the first mode to charge at least one cell of a multilevel rectifier of the multilevel power conversion system.

8. The charging system of claim 2, wherein the controller is operative in the first mode to charge at least one cell of a multilevel rectifier of the multilevel power conversion system.

9. The charging system of claim 1, wherein the controller is operative in the first mode to charge selected cells of the multilevel power conversion system one at a time.

10. The charging system of claim 1, wherein the controller is operative in the first mode to charge at least two selected cells of the multilevel power conversion system concurrently.

11. The charging system of claim 1, wherein the controller is operative in the first mode to charge all cells of the multilevel power conversion system concurrently.

12. The charging system of claim 1, wherein the controller is operative in the first mode to charge at least one cell of a multilevel inverter of the multilevel power conversion system.

13. The charging system of claim 1, wherein the controller is operative in the first mode to charge at least one cell of a multilevel rectifier of the multilevel power conversion system.

14. The charging system of claim 1, wherein the at least one blocking component is at least one diode coupled in series with the charging source between the first and second DC bus nodes.

15. The charging system of claim 1, wherein the at least one blocking component is at least one switch coupled in series with the charging source between the first and second DC bus nodes.

16. A multilevel power conversion system, comprising:
  a multilevel inverter comprising a plurality of multilevel cells coupled in a series circuit between first and second DC bus nodes, and at least one output inductor coupled between the series circuit and an inverter output, individual cells of the multilevel inverter comprising first and second output terminals for connection with preceding and succeeding cells in the series circuit;
  a controller operative to selectively provide switching control signals to the cells of the multilevel inverter; and
  a charging circuit, comprising:
    a charging source operative in a first mode to provide a DC voltage less than a nominal cell capacitor voltage of the multilevel power conversion system, and
    at least one blocking component coupled in series with the charging source between the first and second DC bus nodes and operative in the first mode to allow charging current to flow from the charging source to cells of the multilevel power conversion system;
  wherein the controller is operative in the first mode to selectively provide the switching control signals to the cells of the multilevel inverter to alternate the switching states of at least one selected cell between a first state to bypass the at least one selected cell by coupling the first and second output terminals of the at least one selected cell to one another, and a second state to couple at least one cell capacitor of the at least one selected cell between the first and second output terminals of the at least one selected cell to charge the at least one cell capacitor of the at least one selected cell; and
  wherein the controller is operative in a second mode to selectively provide switching control signals to the cells of the multilevel inverter to convert DC power from the first and second DC bus nodes to provide AC output power via the inverter output.

17. The power conversion system of claim 16, wherein the controller is operative in the first mode to charge selected cells of the multilevel inverter one at a time.

18. The power conversion system of claim 16, wherein the controller is operative in the first mode to charge at least two selected cells of the multilevel inverter concurrently.

19. The power conversion system of claim 16, comprising a multilevel rectifier comprising a plurality of multilevel rectifier cells coupled in a second series circuit between the first and second DC bus nodes, individual rectifier cells of the multilevel rectifier comprising first and second output terminals for connection with preceding and succeeding cells in the second series circuit;
  wherein the controller is operative in the first mode to selectively provide switching control signals to the rectifier cells of the multilevel rectifier to alternate the switching states of at least one selected rectifier cell between a first state to bypass the at least one selected rectifier cell by coupling the first and second output terminals of the at least one selected rectifier cell to one another, and a second state to couple at least one cell capacitor of the at least one selected rectifier cell between the first and second output terminals of the at least one selected cell to charge the at least one cell capacitor of the at least one selected rectifier cell; and
  wherein the controller is operative in the second mode to selectively provide the switching control signals to the rectifier cells of the multilevel rectifier to convert AC input power to provide DC power at the first and second DC bus nodes.

20. A method for charging cell capacitors of a multilevel power conversion system, the method comprising:
  providing a DC voltage between first and second DC bus nodes of the multilevel power conversion system, the DC voltage being less than a nominal cell capacitor voltage of the multilevel power conversion system;
  alternating switching states of at least one selected cell of at least one of a multilevel rectifier and a multilevel inverter of the multilevel power conversion system between a first state to bypass the at least one selected cell by coupling the first and second output terminals of the at least one selected cell to one another, and a second state to couple at least one cell capacitor of the at least one selected cell between the first and second output terminals of the at least one selected cell to charge the at least one cell capacitor of the at least one selected cell.

* * * * *